United States Patent [19]

Floyd III

[11] Patent Number: 4,802,303

[45] Date of Patent: Feb. 7, 1989

[54] INSECT TRAP

[75] Inventor: John Floyd III, Acala, Fla.

[73] Assignee: Fly Bye, Inc., Lexington, Ky.

[21] Appl. No.: 161,774

[22] Filed: Feb. 29, 1988

[51] Int. Cl.$^4$ ............................................. A01M 1/20
[52] U.S. Cl. ........................................ 43/131; 43/114
[58] Field of Search ................. 43/107, 114, 115, 124, 43/131, 132.1, 116, 117

[56] References Cited

U.S. PATENT DOCUMENTS

| | | | |
|---|---|---|---|
| 3,619,934 | 11/1971 | Tunstall et al. | 43/131 |
| 3,624,953 | 12/1971 | Crosby | 43/131 |
| 3,708,908 | 1/1973 | Levey | 43/114 |
| 4,490,938 | 1/1985 | Baker | 43/114 |
| 4,577,434 | 3/1986 | Davis | 43/114 |
| 4,671,010 | 6/1987 | Conlee et al. | 43/114 |

OTHER PUBLICATIONS

"The Safest and Most Effective Way to Eliminate Flies for Todays Equine" 1984 by John Floyd.

Primary Examiner—M. Jordan
Attorney, Agent, or Firm—King and Schickli

[57] ABSTRACT

An insect trap is provided utilizing a chemical essence to attract flies and a separate poison to kill the flies. The insect trap includes an outer cylindrical shell having openings through which flies can enter and the aroma from the essence can escape. A coaxial inner tube threadedly engages the top inside of the outer shell and extends through an open bottom of the shell. A base is attached to the tube and forms a reservoir inside for receiving a wick saturated with the essence. An outer sleeve containing poison is mounted coaxially to the inner sleeve. A chimney effect is created in the space between the inner tube and outer sleeve. During use, air enters the annular chamber surrounding the inner tube through entry apertures provided in the base of the outer sleeve. The air continues upwardly, entering the inner chamber through entry orifices where it mixes with the essence. The aromatic air exits the inner tube through release orifices. The aroma continues flowing over the top of the outer sleeve, and after dilution with additional air ultimately exits through the openings in the outer shell. Flies being attracted by the aroma enter through the openings in the outer shell and light upon the outer sleeve. The flies eat the poison coated on the sleeve and die, falling to the ground.

11 Claims, 1 Drawing Sheet

INSECT TRAP

TECHNICAL FIELD

The present invention relates generally to a flying insect trap and, more particularly to a fly trap using an attracting essence and a poison to kill flies.

BACKGROUND OF THE INVENTION

This invention concerns an apparatus for attracting and killing flies. This apparatus is particularly well suited for use around animals, specifically, horses.

As is commonly known, flies carry numerous harmful diseases. As such, flies threaten the health of not only humans, but animals as well. For example, flies are known to carry at least 60 viruses and parasites which infect the horse. Indeed, one disease carrying fly can infect an entire stable of horses.

Furthermore, the presence of flies in a stable has the effect of causing stress to the horses. Flies are an annoyance to horses much the same as they are an annoyance to humans. Horses, especially thoroughbreds, represent significant capital investments, not only for their purchase, but for their maintenance and upkeep as well. The presence of flies in the stables threatens this investment.

Attempts to eradicate flies usually center around the use of foggers or misters and even rubbing toxic pesticides on the horse's body. Constant and prolonged exposure to the toxins so used has a negative effect on horses. Indeed, it is believed that prolonged exposure to toxic pesticides may produce genetic damage.

Other approaches have been to provide a more effective trap to capture and/or kill the flies. U.S. Pat. No. 3,708,908 to Levey discloses an insect trap having an inner tube with holes passing through the tube walls. A sticky substance coats the outside of the tube. A tubular perforated housing surrounds the inner tube. A bag of attractant is placed within the inner tube. In use, insects are attracted to the odor of the attractant. The insects enter the trap through the perforations in the outer tubular housing and light upon the sticky substance on the outside of the inner tube. They become trapped upon this sticky substance and eventually die.

This trap is of limited effectiveness. More specifically, its effective range of attracting insects is small. This is because although the tube has perforations to allow the aroma of the essence to escape, the device has no means for actively diffusing the aroma. Additionally, the trap is useful only over a short period of time, because the sticky substance soon loses its effectiveness and the insects are allowed to escape. The trap is designed not to be reuseable and must be replaced often. This becomes very expensive.

A need exists, therefore, for a insect trap having a wide range for attracting insects, but is not offensive to humans or animals. Such an aparatus would be highly efficient, yet simple, self-contained and relatively economical to implement.

SUMMARY OF THE INVENTION

It is a primary object of the present invention to provide an insect trap overcoming the limitations and disadvantages of the prior art.

Another object of the present invention is to provide a fly trap which is highly effective in eradicating flies yet exhibits no detrimental effects upon humans or horses.

It is yet another object of the present invention to provide an insect trap utilizing a separate attractant and means for actively expeling the attractant around the trap over a wide range.

Still another object of the present invention is to provide a fly trap having a readily replaceable poison containing component thereby contributing to the economical operation.

A further object of the present invention is to provide a fly trap utilizing highly effective poison which is shielded from accidental human and equine contact.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a fly trap is provided utilizing a chemical essence to attract flies. This fly trap is effective to reduce or eradicate flies in stables and the like.

The fly trap includes an outer cylindrical shell having openings through which flies can enter and the attracting odor from the essence can escape. In the preferred embodiment, a coaxial inner tube threadedly engages the top inside of the outer shell and extends through an open bottom of the shell. A base is attached to the tube, and forms a reservoir inside for receiving the liquid essence. A wick is placed within the tube, its base placed within the liquid essence. The wick serves to facilitate dispersion of the essence.

Four spaced entry orifices are provided in the tube approximately ⅓ of the distance up from the base. An annular deflecting baffle surrounds the outer periphery of the inner tube, sealing the area between the inner tube and an outer sleeve positioned coaxially to the inner tube. The deflecting baffle is positioned slightly above the entry orifices and works in concert with them to direct air into the tube. The aroma given off by the essence mixes with the air in the inner tube. The air exits the inner tube through four sets of release orifices placed approximately ⅓ of the distance from the top.

The outer sleeve is freely mounted upon the base and is maintained in a coaxial relationship to the inner tube by the deflecting baffle. Two entry apertures in the form of elongated notches are provided in the base of the outer sleeve allowing entry of air into the trap. The outer sleeve is coated with fly poison. The poison extends along that length of the outer sleeve that is inside the outer shell when installed in the trap. In this manner the poison can not be accidentally contacted. Furthermore, this outer sleeve is readily replaceable when the poison is expended. This results in a significant cost savings because the entire trap need not be replaced when the poison is expended.

According to an important aspect of this invention, a chimney effect is created in the space between the inner tube and the outer sleeve. This chimney effect creates a positive draft within the fly trap, actively dispersing the aromatic air/essence vapor into the surrounding atmosphere.

During use, air enters the annular chamber defined by the inner tube and outer sleeve through the bottom entry apertures. The air continues upwardly and enters the inner tube through the entry orifices, directed by the deflecting baffle. Once inside the inner tube, the air mixes with the aroma of the essence. The resultant aromatic air mixture exits the inner tube through the release orifices. The aromatic air continues upwardly in the annular chamber, ultimately exiting over the top of the outer sleeve. The aromatic air then exists the fly trap through the openings in the outer shell. Advantageously, this chimney effect serves to create a positive draft within the fly trap. The effect is to actively disperse the aromatic air to the surrounding atmosphere over a relatively wide range.

The odor of the essence is virtually undetectable to humans and animals due to the effective mixing and dispersal. However, it is highly attractive to flies. Being attracted to the fly trap by the odor of the essence, the flies enter the trap through the openings in the outer shell. As is well known in the art, flies tend to prefer vertical surfaces. The flies light upon the vertical surface of the outer sleeve. The flies eat the poison coating the outer sleeve and immediately die. The flies then fall out of the trap through the open bottom onto the floor or other surface below. Providing an open bottom to the trap allows the dead flies to be expelled from the trap, rather than clogging it. The dead flies are easily swept up from the floor and disposed of.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
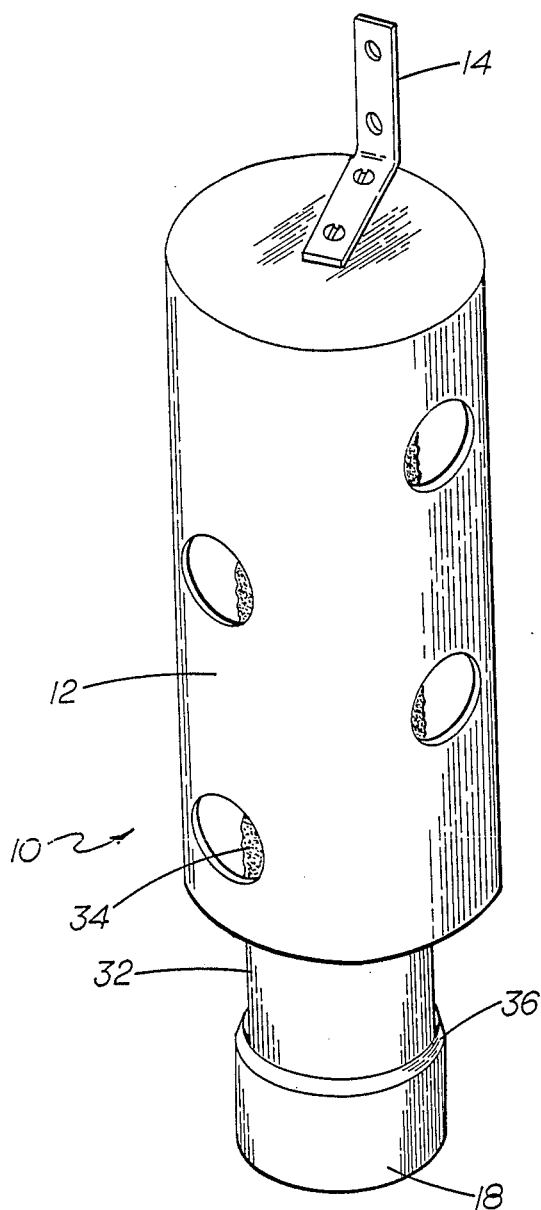
FIG. 1 is a perspective view of the fly trap of the present invention.
Figure 2:
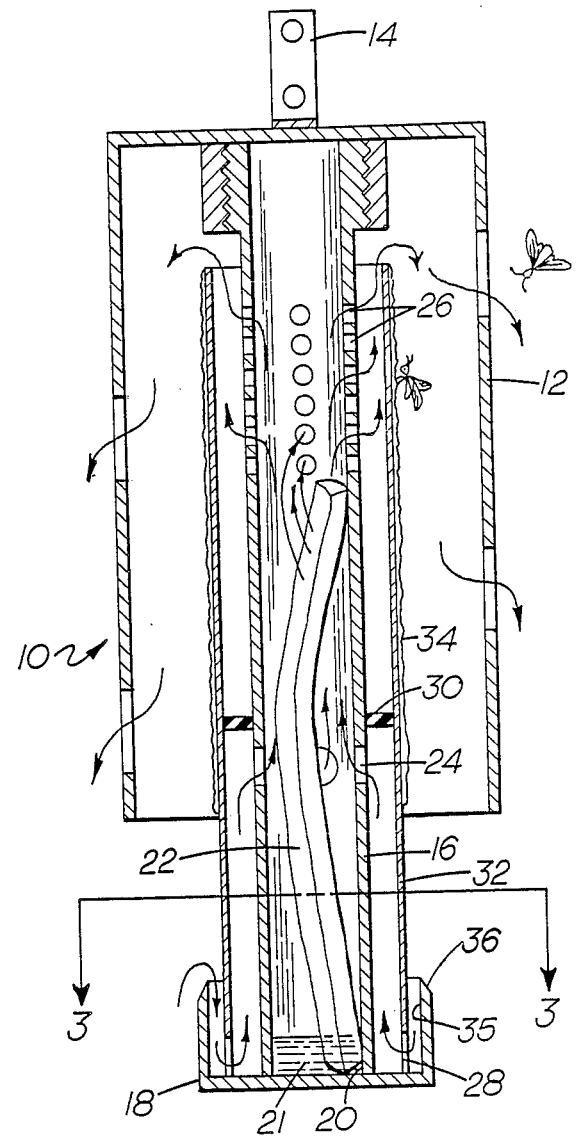
FIG. 2 is an enlarged cross-sectional view of the fly trap of the present invention including action arrows showing the flow of the aromatic air by the chimney effect.
Figure 3:
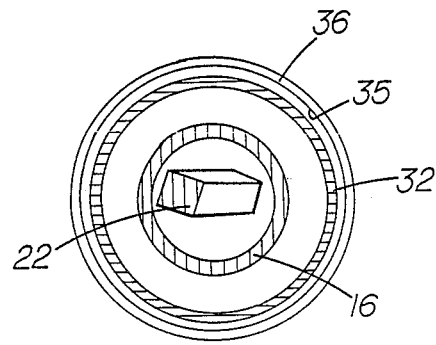
FIG. 3 is a cross-sectional view taken along sectional line 3—3 of FIG. 2.

Reference is now made to FIGS. 1 and 2 showing the fly trap of the present invention. The fly trap is intended to be used around animals, particularly horses, and is designed to effectively attract and kill flies. The fly trap is uniquely designed to include an internal chimney effect thereby actively dispersing aroma of an essence or attractant. The fly trap is easily installed and maintained, and uses no external source of energy, such as electricity.

As shown in FIG. 1, the fly trap 10 includes an outer cylindrical shell 12. Outer shell 12 has an upper closed end and a lower open end, as best shown in FIG. 2. Outer shell 12 includes openings in its walls through which flies can enter, and the attracting aroma from the essence can escape. Mounting bracket 14 is provided to secure the fly trap 10 to a stationary object within about one foot of the ground.

A coaxial inner tube 16 threadedly engages the top inside of the outer shell 12. Base 18 forms a means for closing and is attached to the lower end of tube 16. This forms reservoir 20 inside the inner tube 16 for receiving a liquid essence 21. Wick 22 is placed within tube 16 to facilitate dispersion of the aroma from liquid essence 21. In the preferred embodiment, wick 22 is made of felt. As shown in FIG. 2, the base of wick 22 is submerged in the liquid essence 21.

The formula for the essence does not form a part of the present invention. Any suitable liquid or emulsion may be used successfully as the essence 21, such as ammonia or animal feces mixed with a liquid carrier. The essence need only be suitable to provide vapor release from the wick or the like and be picked up and carried by the unique chimney effect of the trap 10.

Four spaced entry orifices 24 are provided in the inner tube 16 approximately $\frac{1}{3}$ of the distance up from the base 18. These orifices 24 are provided to allow entry of air into tube 16. Once inside, the air mixes with the essence 21 through contact with wick 22. The aromatic air thus created exits tube 16 through four sets of release orifices 26 placed approximately $\frac{1}{3}$ of the distance from the top. In the preferred embodiment, orifices 24 are $\frac{1}{4}$" inch in diameter and orifices 26 are $\frac{1}{8}$" in diameter. Through experimentation, these dimensions have been found to provide optimum performance.

As shown in FIG. 2, outer sleeve 32 is retained within trap 10 by base 18. Two entry apertures 28 are provided in the base of sleeve 32 to allow entry of air into the trap 10. Deflecting baffle 30 is provided on the outer wall of inner tube 16 to direct the flow of air inside trap 10 and coaxially retain outer sleeve 32. In the preferred embodiment, baffle 30 is fabricated from neoprene rubber.

Advantageously, outer sleeve 32 is fabricated of a low cost material, such as cardboard, and is thus disposable. A poison 34, such as the insecticide DDYP plus sugar, is sprayed or painted onto the outer surface of the sleeve. This insecticide is sold under various trade names, such as Ectrin and Golden Maldron and is readily available from insect control specialty businesses. As with the essence 21, the particular formula for the poison 34 does not form a feature of the present invention.

In hot weather, poison 34 sometimes drips down tube 32. Annular space 35 is provided in base 18 to catch any dripping poison 34, preventing it from falling onto the floor.

During use, as the poison 34 is eaten by the flies, it becomes expended. When poison 34 is fully expended, outer sleeve 32 is removed along with inner tube 16 by unscrewing tube 16 from outer shell 12. This is easily accomplished by turning base 18 which is attached to tube 16. Once removed, the expended sleeve 32 is pulled over tube 16 and discarded or recoated. A fresh sleeve 32 is installed by reversing the above steps. This allows fly trap 10 to be replenished rather than replaced, saving considerable expense.

As is known in the art, a security seal (not shown) can be attached to base 18 and anchored to outer shell 12. Security seals vary widely in form, but each must be destroyed to be removed. Such a security seal serves to prevent accidental or unauthorized opening of the fly trap.

As shown in FIG. 2, the poison 34 extends only along the upper ⅔ of outer sleeve 32 which is contained within outer shell 12. In this manner, accidental contact by humans or animals with the poison is avoided.

As further shown in FIG. 2, outer sleeve 32 is shorter than inner tube 16. This difference in length provides an open area at the top inside of the fly trap.

According to an important aspect of this invention, a chimney effect is created in the space between the inner tube 16 and outer sleeve 32. This chimney effect serves to create a positive draft within the fly trap. This positive draft actively disperses the aromatic air into the surrounding atmosphere to make attraction of the flies more efficient.

As shown by the arrows in FIG. 2, air enters the annular chamber defined by the inner tube 16 and outer sleeve 32 through a pair of entry apertures 28. The air continues upwardly and is deflected; by baffle 30 to enter the inner tube 16 through the entry orifices 24. Once inside, the air travels along wick 22 which is saturated with the essence 21. In this manner, the air mixes with the vapor of the essence 21, thereby creating aromatic air. The resultant aromatic air exits inner tube 16 through release orifices 26. The air continues upwardly in the annular chamber and ultimately spills over the top of outer sleeve 32 through the space provided. The aromatic air then mixes with additional air and exits the fly trap through the openings in outer shell 12 and through the open bottom of the outer sleeve 12 to attract the flies.

The aromatic air engaging the inside surface of the sleeve 32 permeates the porous cardboard providing a concentrated location for the attracting aroma or smell. This helps lure the fly to light on the sleeve rather than some other surface in the trap 10. The fly immediately starts attempting to eat the poison 34 to get to the attracting aroma source. Furthermore, the poison 34 itself may have some limited aromatic attractant function adding efficiency to this aspect of the trap. The flies are killed by the poison and fall out of the trap through the open bottom of outer shell 12.

As the aromatic air enters the enlarged volume of the outer shell 12 (note flow arrows in FIG. 2), there is further mixing, and thus dilution by air. This dilution is sufficient to reduce the strength to a level that is still a strong attractant for flies but not offensive to humans and animals when finally released through the openings in the shell 12. The increased volume flow of inducted air caused by the unique chimney effect of the trap 10 is responsible for the efficiency of this concept.

The upper edge of base 18 is chamfered thereby creating deflecting shoulder 36. Shoulder 36 is provided to deflect the falling flies. This action tends to keep the flies from falling into annular space 35, and causing a clogging problem, as well as preventing flies sticking to the trap and causing an unsightly appearance. Instead, the flies fall to the floor where they may be easily swept up or otherwise disposed of. If necessary, an annular screen may be provided between the sleeve 32 and the shoulder 36.

In summary, numerous benefits have been described which result from employing the concepts of the present invention. In particular, the fly trap 10 utilizes a separate esence or attractant released from the inner tube and a poison or bait on the sleeve 32 to effectively kill flies. The tube and sleeve combination is designed to create a positive draft of air within the trap. This positive draft serves to actively disperse the aromatic air from the trap 10. This serves to dramatically increase the effectiveness of the trap. Outer sleeve 32 is easily removed and replaced. This provides for economical use because only the outer sleeve 32 and not the entire fly trap need be replaced when the poison 34 is expended.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. An insect trap utilizing an aromatic attractant essence comprising:
    a cylindrical outer shell having an upper closed end and a lower open end;
    a coaxial inner tube having first and second ends, means for attaching said first end to the inside of said closed end of said outer shell said second end of said inner tube extending through said open end of said outer shell;
    said inner tube having a plurality of orifices passing through the tube walls, means for closing the second end of said inner tube;
    said closing means cooperating with said inner tube so as to confine said essence;
    an outer sleeve coaxial to said inner tube and spaced from said inner tube;
    means on said trap to kill the flies attracted; and
    means for inducing a positive draft of air through said orifices within said insect trap;
    whereby said positive draft mixes said essence with inducted air creating aromatic air and releases said aromatic air into the atmosphere to attract insects.

2. The insect trap of claim 1, wherein said outer shell is enlarged and has a plurality of openings to provide the insects entry into the trap and to allow release of diluted aromatic air.

3. The insect trap of claim 2, wherein said outer sleeve is coated with a poisonous substance to kill the insects and porous to absorb a portion of said aromatic air.

4. The insect trap of claim 1, wherein said inner tube orifices include entry and release orifices.

5. The insect trap of claim 4, wherein said entry orifices are positioned approximately ⅓ of the way from said second end of said inner tube.

6. The insect trap of claim 4, wherein said release orifices are positioned approximately ⅓ of the way from said first end of said inner tube.

7. The insect trap of claim 4, wherein said means for inducing a positive draft includes at least two entry apertures in said outer sleeve, an internal deflecting baffle and an open area at the upper end of said outer sleeve.

8. The insect trap of claim 1, wherein said inner tube further includes a wick to facilitate dispersion of the essence.

9. The insect trap of claim 1, wherein is provided means for positioning said sleeve coaxially on said tube.

10. The insect trap of claim 9, said positioning means including said deflecting baffle.

11. The insect trap of claim 1, wherein said outer sleeve includes mounting means for mounting said insect trap to a stationary object.

* * * * *